US008248999B2

(12) United States Patent
Gossain et al.

(10) Patent No.: US 8,248,999 B2
(45) Date of Patent: Aug. 21, 2012

(54) METHOD AND APPARATUS FOR RESOURCE RESERVATION IN A MULTIHOP WIRELESS NETWORK

(75) Inventors: Hrishikesh Gossain, Apopka, FL (US); Keith J. Goldberg, Casselberry, FL (US); Sebnem Zorlu Ozer, North Wales, PA (US)

(73) Assignee: Motorola Solutions, Inc., Schaumburg, IL (US)

( * ) Notice: Subject to any disclaimer, the term of this patent is extended or adjusted under 35 U.S.C. 154(b) by 1024 days.

(21) Appl. No.: 11/559,239

(22) Filed: Nov. 13, 2006

(65) Prior Publication Data
US 2008/0112357 A1 May 15, 2008

(51) Int. Cl.
*H04W 4/00* (2009.01)
(52) U.S. Cl. ........................................ 370/329; 370/338
(58) Field of Classification Search .................. 370/329, 370/252, 337, 311, 338, 235, 348, 468, 395, 370/328; 455/446, 422; 709/238; 398/7
See application file for complete search history.

(56) References Cited

U.S. PATENT DOCUMENTS

| | | | | |
|---|---|---|---|---|
| 6,751,190 B1 * | 6/2004 | Swallow | ........................ | 370/217 |
| 7,570,593 B1 * | 8/2009 | ElBatt et al. | ................... | 370/238 |
| 2003/0007622 A1 * | 1/2003 | Kalmanek et al. | ............ | 379/219 |
| 2003/0033394 A1 * | 2/2003 | Stine | .............................. | 709/222 |
| 2003/0202469 A1 * | 10/2003 | Cain | ............................. | 370/230 |
| 2006/0034219 A1 * | 2/2006 | Gu et al. | .......................... | 370/329 |
| 2006/0133272 A1 * | 6/2006 | Yuan et al. | ..................... | 370/230 |
| 2006/0268792 A1 * | 11/2006 | Belcea | ........................... | 370/338 |
| 2007/0002821 A1 * | 1/2007 | Carlson et al. | ................ | 370/349 |
| 2007/0008884 A1 * | 1/2007 | Tang | .............................. | 370/230 |
| 2007/0097892 A1 * | 5/2007 | Tsang | ............................ | 370/310 |
| 2007/0268880 A1 * | 11/2007 | Bellur et al. | ................... | 370/338 |
| 2008/0298250 A1 * | 12/2008 | Larsson | ......................... | 370/238 |
| 2009/0290494 A1 * | 11/2009 | Govindan et al. | ............. | 370/238 |

FOREIGN PATENT DOCUMENTS

GB 2411549 A 8/2005

OTHER PUBLICATIONS

Braden, R. et al., Resource Reservation Protocol (RSVP), RFC 2205, Sep. 1997, 100 pages.
Chakrabarti, Gautam et al., Load Balancing and Resource Reservation in Mobile Ad Hoc Networks, Ad Hoc Networks, vol. 4, Issue 2, Mar. 2006, pp. 186-203.
PCT/US07/80026, PCT Search Report and Written Opinion, mailed Mar. 11, 2008, 9 pages.
PCT/US2007/080026, PCT Preliminary Report on Patentability, mailed May 28, 2009, 10 pages.
EPC, European Application No. 07853702.4, Extended European Search Report, Jan. 27, 2010, 6 pages.
Cansever, D.H. et al, Quality of Service Support in Mobile Ad-hoc IP Networks, Military Communications Conference Proceedings (MILCOM), Oct. 31-Nov. 3, 1999, vol. 1, IEEE, 1999, pp. 30-34.
Office Action mailed on May 17, 2010 for counterpart Australian Patent Application No. 2007324107.

* cited by examiner

*Primary Examiner* — Jean Gelin
*Assistant Examiner* — Mahendra Patel
(74) *Attorney, Agent, or Firm* — Randi L. Karpinia

(57) ABSTRACT

A message format for use in one or more multihop flow reservation messages in a multihop wireless network includes a reservation originator identification; a reservation terminator identification; a sequence control; and optionally a flow originator identification. A multihop flow reservation comprises forwarding a traffic stream request including the message format and forwarding a traffic stream reply including the message format along a multihop route. After the traffic stream reservation is completed, a data is forwarded along the multihop route.

19 Claims, 13 Drawing Sheets

METHOD AND APPARATUS FOR RESOURCE RESERVATION IN A MULTIHOP WIRELESS NETWORK

FIELD OF THE INVENTION

The present invention relates generally to wireless networks; and more particularly to resource reservation within multihop wireless networks.

BACKGROUND

In recent years, communication through the use of ad hoc networks has become more prevalent. Ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network.

A mesh network is a form of an ad hoc network based on autonomous collections of mobile nodes that communicate with each other over wireless links having limited bandwidths. Individual nodes in a mesh network can perform routing functions, which enable a mesh network to be reconfigured around blocked paths or poor connections by "hopping" from one node to another until a destination is reached. A mesh network is thus described as self-healing, as it can still operate effectively even when particular nodes break down or leave the network.

The lack of a central controller in a mesh network creates a need for new methods to provide efficient end-to-end traffic control such as call admission control (CAC). Call admission control regulates communication quality by limiting the number of calls that can be active on a particular link at the same time. Call admission control does not guarantee a particular level of quality on the link in a mesh network, but it does allow for the regulation of the amount of bandwidth or time consumed by active calls on the link.

As wireless communications networks such as mesh networks become more prevalent, security continues to be a major concern to both communications network providers and end users. In a wireless communications mesh network the security environment can offer the greatest challenges since data may be readily received and manipulated by many nodes. The radio links used in a wireless communications mesh network expose signaling and other data traversing the network to eavesdroppers and/or would-be hackers.

Network Admission Control (NAC) is a set of technologies and solutions which enforce security policy compliance on all devices (i.e. nodes, access points, and the like) seeking to access network resources, thereby limiting damage from emerging security threats. NAC can allow network access only to compliant and trusted devices and can restrict the access of noncompliant devices.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
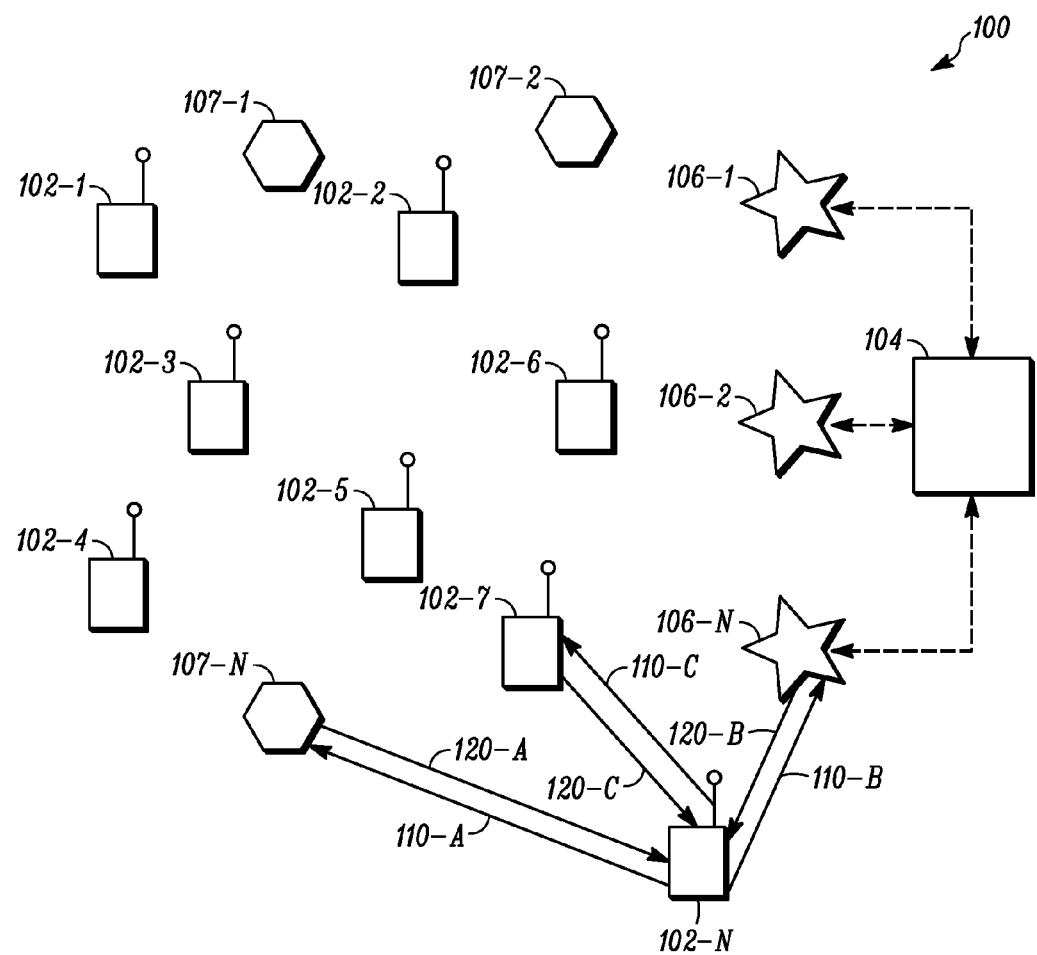
FIG. 1 is a block diagram illustrating an example of a communication network 100 employing some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to resource reservation in a multihop wireless network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of resource reservation in a multihop wireless network described herein. The non-processor circuits may include, but are not limited to, a radio receiver, a radio transmitter, signal drivers, clock circuits, power source circuits, and user input devices. As such, these functions may be interpreted as steps of a method to perform resource reservation in a multihop wireless network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In multihop wireless networks, such as those utilizing the IEEE 802.11e standard, mechanisms of admission control and quality of service (QoS) setup are provided between a quality of service station (QSTA) and its associated quality of service access point (QAP). It is desirable in such networks for both a QSTA and a QAP to be able to initiate a traffic stream (TS) reservation to each other or to other QAPs in a Wireless Distribution (WDS). It is also desirable for a large number of Traffic Stream (TS) to be supported between two nodes.

Mechanisms are needed to extend the single hop admission control in the 802.11e protocol to multihop scenarios which is extensible to QAP and can provide distributed admission control between forwarding devices.

The present invention provides a mechanism for admission control and multihop traffic stream (TS) reservation by providing a distributed mechanism of TS reservation, and sequence control in a multihop environment. Methods outlined herein are essential for applications which need admission control (e.g. voice) and where packets need to travel multihop over wireless mesh networks or between forwarding devices.

The present invention provides the necessary hooks for resource reservation in multihop wireless mesh. It includes a new information element to uniquely identify a flow <reservation originator, reservation terminator, sequence control> which can be used in existing admission control mechanisms to handle multihop flow reservation.

FIG. 1 is a block diagram illustrating an example of a communication network 100 employing some embodiments of the present invention. For illustration purposes, the communication network 100 comprises an adhoc wireless communications network. For example, the adhoc wireless communications network can be a mesh enabled architecture (MEA) network or an 802.11 network (i.e. 802.11a, 802.11b, or 802.11g) It will be appreciated by those of ordinary skill in the art that the communication network 100 in accordance with the present invention can alternatively comprise any packetized communication network. For example, the communication network 100 can be a network utilizing packet data protocols such as TDMA (time division multiple access), GPRS (General Packet Radio Service) and EGPRS (Enhanced GPRS).

As illustrated in FIG. 1, the communication network 100 includes a plurality of mobile nodes 102-1 through 102-$n$ (referred to generally as nodes 102 or mobile nodes 102 or mobile communication devices 102), and can, but is not required to, include a fixed network 104 having a plurality of access points 106-1, 106-2, ... 106-$n$ (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, a public switched telephone network (PSTN) and the Internet. The communication network 100 further can include a plurality of fixed routers 107-1 through 107-$n$ (referred to generally as nodes 107 or fixed routers 107 or fixed communication devices 107) for routing data packets between other nodes 102, 106 or 107. It is noted that for purposes of this discussion, the nodes discussed above can be collectively referred to as "nodes 102, 106 and 107", or simply "nodes" or alternatively as "communication devices."

As can be appreciated by one skilled in the art, the nodes 102, 106 and 107 are capable of communicating with each other directly, or via one or more other nodes 102, 106 or 107 operating as a router or routers for packets being sent between nodes. As illustrated in FIG. 1, each node communicates with other neighboring nodes using a transmitting link and a receiving link associated with the node and each of the neighboring nodes. For example, node 102-N, as illustrated, communicates with node 107-N using a transmitting link 110-A and a receiving link 120-A, communicates with node 106-N using a transmitting link 110-B and a receiving link 120-B, and communicates with node 102-7 using a transmitting link 110-C and a receiving link 120-C.

Figure 2:
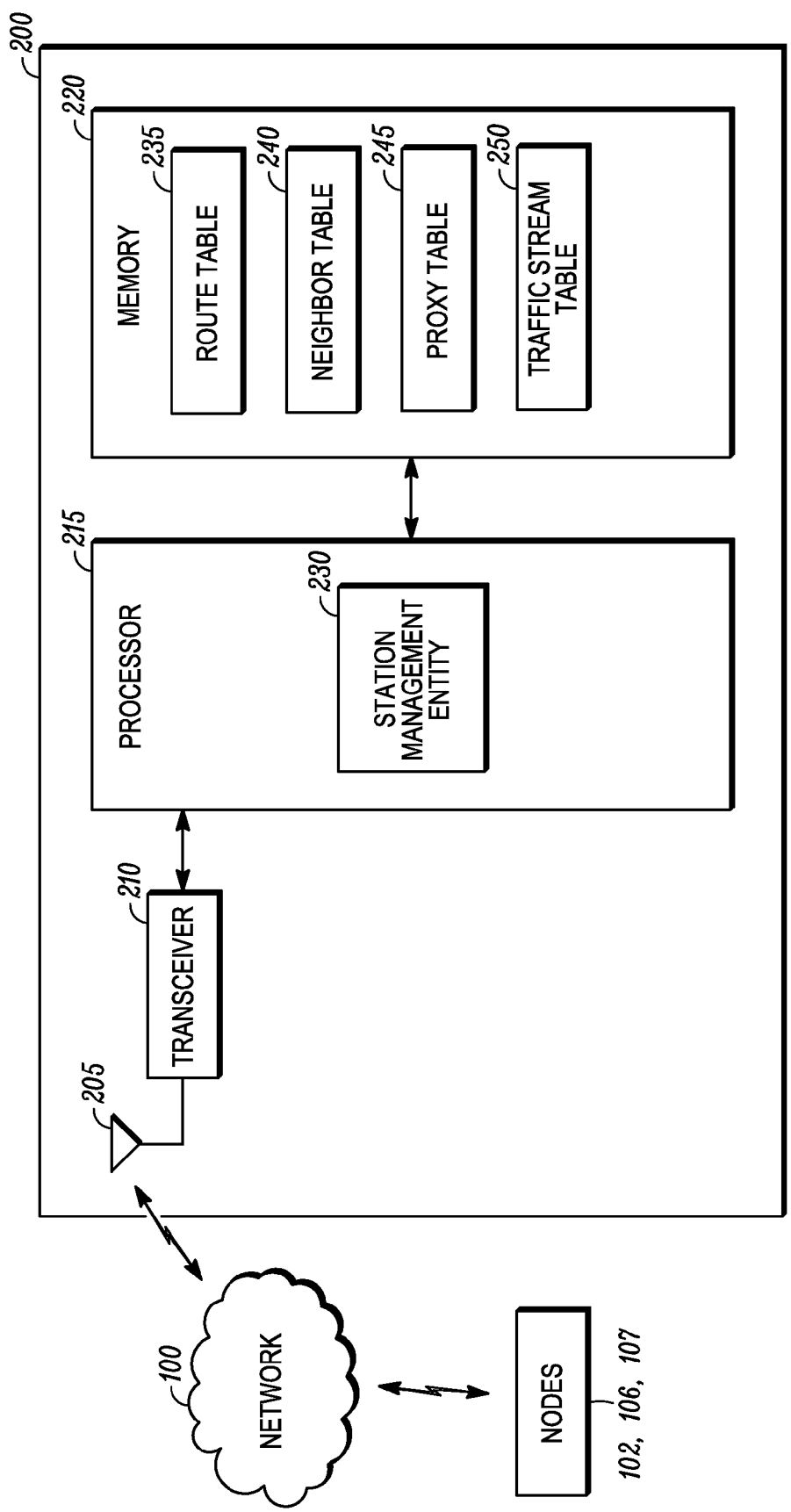
FIG. 2 is an exemplary electronic block diagram of a communication device 200 in accordance with some embodiments of the present invention.

FIG. 2 is an exemplary electronic block diagram of a communication device 200 in accordance with some embodiments of the present invention. The communication device 200, for example, can exemplify one or more of the nodes 102, 106, and 107 of FIG. 1. As illustrated, the communication device 200 includes an antenna 205, a transceiver (or modem) 210, a processor 215, and a memory 220.

The antenna 205 intercepts transmitted signals from one or more nodes 102, 106, 107 within the communication network 100 and transmits signals to the one or more nodes 102, 106, 107 within the communication network 100. The antenna 205 is coupled to the transceiver 210, which employs conventional demodulation techniques for receiving and transmitting communication signals, such as packetized signals, to and from the communication device 200 under the control of the processor 215. The packetized data signals can include, for example, voice, data or multimedia information, and packetized control signals, including node update information. When the transceiver 210 receives a command from the processor 215, the transceiver 210 sends a signal via the antenna 205 to one or more devices within the communication network 100. In an alternative embodiment (not shown), the communication device 200 includes a receive antenna and a receiver for receiving signals from the communication network 100 and a transmit antenna and a transmitter for transmitting signals to the communication network 100. It will be appreciated by one of ordinary skill in the art that other similar electronic block diagrams of the same or alternate type can be utilized for the communication device 200.

Coupled to the transceiver 210, is the processor 215 utilizing conventional signal-processing techniques for processing received messages. It will be appreciated by one of ordinary skill in the art that additional processors can be utilized as required to handle the processing requirements of the processor 215.

In accordance with the present invention, the processor 215 includes a Station Management Entity (SME) 230 for managing traffic stream reservations. The Station Management Entity (SME) 230, for example, at a traffic initiator triggers the multihop Traffic Stream (TS) reservation to its "portal" or from the "initiator" to the "destination" if the destination is in the mesh. The SME 230 at a QSTA can tell the MAC layer Management Entity (MLME) that it is a new call and reservation is needed. In case the destination is in another mesh, the SME 230 at a destination triggers a multihop Traffic Stream (TS) reservation from the "destination" to its "portal". It will be appreciated by those of ordinary skill in the art that the Station Management Entity (SME) 230 can be hard coded or programmed into the communication device 200 during manufacturing, can be programmed over-the-air upon customer subscription, or can be a downloadable application. It will be appreciated that other programming methods can be utilized for programming the Station Management Entity (SME) 230 into the communication device 200. It will be further appreciated by one of ordinary skill in the art that the Station Management Entity (SME) 230 can be hardware circuitry within the communication device 200. In accordance with the present invention, the Station Management Entity (SME) 230 can be contained within the processor 215 as illustrated, or alternatively can be an individual block operatively coupled to the processor 215 (not shown). Further functionality of the Station Management Entity (SME) 230, in accordance with the present invention, will be described below.

To perform the necessary functions of the communication device 200, the processor 215 is coupled to the memory 220, which preferably includes a random access memory (RAM), a read-only memory (ROM), an electrically erasable programmable read-only memory (EEPROM), and flash memory. The memory 220, in accordance with the present invention, includes storage locations for a route table 235, a neighbor table 240, a proxy table 245, and a traffic stream table 250. The route table 235 includes information used to determine where the node routes packets. The neighbor table 240 includes state information about adjacent neighbor nodes. When newly discovered neighbors are learned, the address and interface of the neighbor is recorded. This information is stored in the neighbor data structure. The neighbor table 240 holds these entries. The proxy table 245 includes the non-routable devices and the routable devices which proxy for those non-routable devices in the mesh networks.

It will be appreciated by those of ordinary skill in the art that the memory 220 can be integrated within the communication device 200, or alternatively, can be at least partially contained within an external memory such as a memory storage device. The memory storage device, for example, can be a subscriber identification module (SIM) card.

Figure 3:
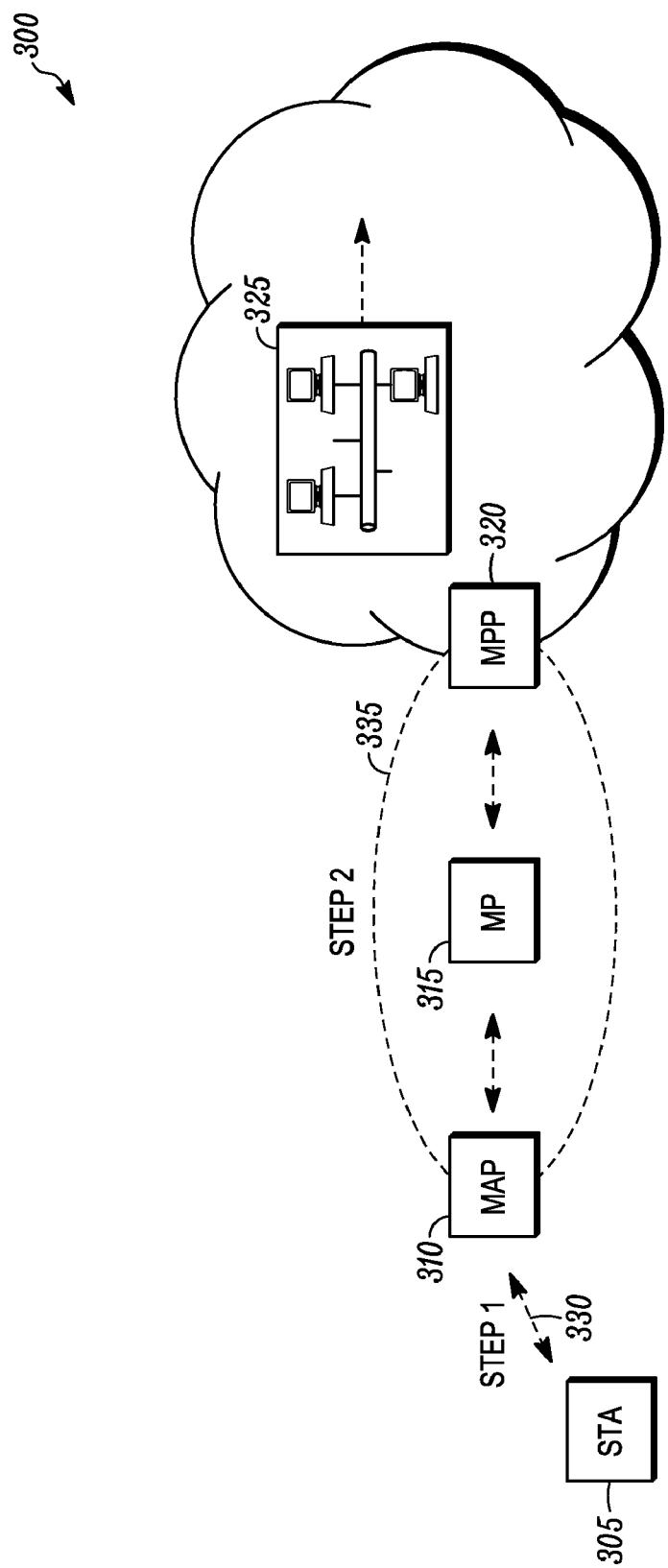
FIGS. 3 and 4 illustrate exemplary scenarios of a voice call initiation within a network in accordance with some embodiments of the present invention.

FIG. 3 illustrates an exemplary scenario of a voice call initiation within a network 300. The network 300, for example, can be a portion of a multihop wireless network such as the wireless communication network 100 of FIG. 1. As illustrated in FIG. 3, station 305 initiates a voice call which needs to travel via multiple hops through Mesh Access Point (MAP) 310, Mesh Point (MP) 315, to reach its portal, Mesh Point Portal (MPP) 320. The MPP 320 then provides access to other portions 325 of the network 300 as illustrated. The initiation step 330, labeled "Step 1" in FIG. 3 typically comprises reservation between the QSTA (STA 305) and its QAP (MAP 31) as is known in the art. For example, STA 305 starts a voice call and asks MAP 310 for permission and to reserve bandwidth for the first hop. The multi-hop step 335, labeled "Step 2" in FIG. 3 will be discussed herein below.

Figure 4:
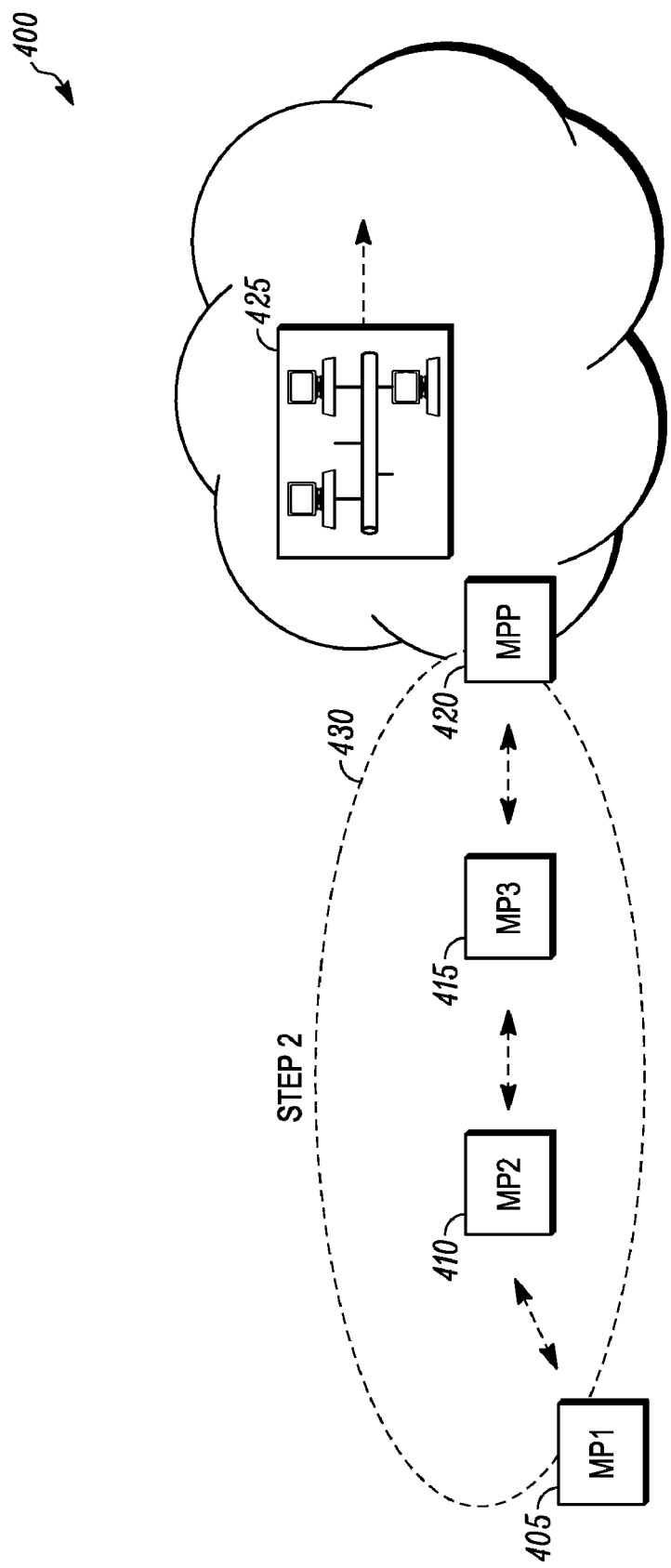

FIG. 4 illustrates an exemplary scenario of a voice call initiation within a network 400. The network 400, for example, can be a portion of a multihop wireless network such as the wireless communication network 100 of FIG. 1. As illustrated in FIG. 4, a Mesh Point MP1 405 initiates a voice call which needs to travel via multiple hops through Mesh Point MP2 410 and Mesh Point MP3 415, to reach its portal, Mesh Point Portal (MPP) 420. The MPP 420 then provides access to other portions 425 of the network 400 as illustrated. In this exemplary scenario, the voice call initiated goes directly to a multi-hop step 430, labeled "Step 2" in FIG. 4 as will be discussed herein below.

When a flow reservation is required, the initiator (i.e. STA 305 in FIG. 3 and MP1 405 in FIG. 4) can identify the end points of the flow in the mesh (i.e. <STA 305, MPP 320> for FIG. 3 or <MP1 405, MPP 420> for FIG. 4) and use its routing module to forward a flow reservation. When the initiator station STA 305 is not aware of its portal, it can use a flow destination address to identify the end points of the flow <STA, Final Destination>. Mesh Points (MPs) such as MP1 405 can use either a final destination or a MPP address to identify the end point of a reservation when the final destination is outside the mesh. Hence for simplicity, in FIG. 7 to be described herein below, MPP is used as the reservation terminating device. When the final destination is within the mesh, and an optimized route to the final destination is available, the reservation terminating device could be the address of the final destination. It will be appreciated by those of ordinary skill in the art that a 3-address frame structure of a management frame (i.e. add traffic stream request (ADDTS.Request)) sent from the STA 305 or the MP1 405 is not sufficient to convey enough information to the MAP 310 or MP2 410 to do a multihop flow reservation to the MPP 320, 420 of FIGS. 3 and 4 respectively. The present invention provides the necessary hooks to implement Step 2 335,430 of FIGS. 3 and 4 respectively. In the majority of the cases (e.g. mesh scalable routing (MSR), 802.11s) routing protocols proactively maintain a route to the portal. Hence TS setup is initiated after the route between a source and a destination is setup.

Mesh Traffic Stream Information Element

Figure 5:
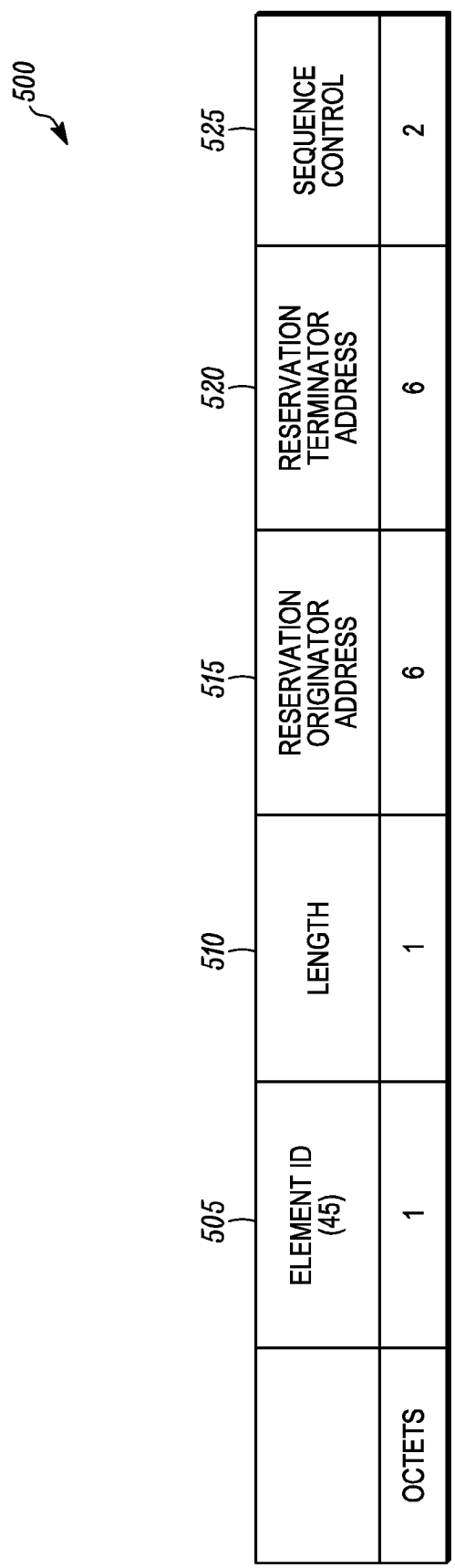
FIG. 5 illustrates an exemplary Information Element format in accordance with some embodiments of the present invention.

FIG. 5 illustrates an exemplary 802.11 Information Element in accordance with some embodiments of the present invention. Specifically, the Information Element Frame Format of FIG. 5 illustrates an exemplary Mesh Traffic Stream Information Element 500 in accordance with some embodiments of the present invention. The Mesh Traffic Stream Information Element 500 can, for example, be included with a Traffic Stream (TS) reservation management frame to do a multihop flow reservation. For example: Add Traffic Stream Request messages (ADDTS.Request), Add Traffic Stream response messages (ADDTS.Response), and Delete Traffic Stream messages (DELTS) can include the Mesh Traffic Stream Information Element Frame Format 500 to forward and/or process a flow reservation message.

As illustrated in FIG. 5, the information element frame format 500 includes an element identification (ID) 505, a length 510, a reservation originator address 515, a reservation terminator address 520, and a sequence control 525. The reservation originator address 515 identifies the source of the traffic stream message. The reservation terminator address 520 identifies the destination of the traffic stream message. When the destination is outside the mesh, the reservation terminator address 520 can be set to either the address of the portal or the destination address itself. The length field 510 is an unsigned binary, which value defines the length in octets of the remaining message. The sequence control 525 is incremented each time a re-negotiation of the same flow is done or during handoff when a reservation request for an existing flow is sent to a new QAP. The sequence control field 525 helps in eliminating the chances of clearing a valid reservation due to a delayed TS delete request (e.g. DELTS) frame.

Figure 6:
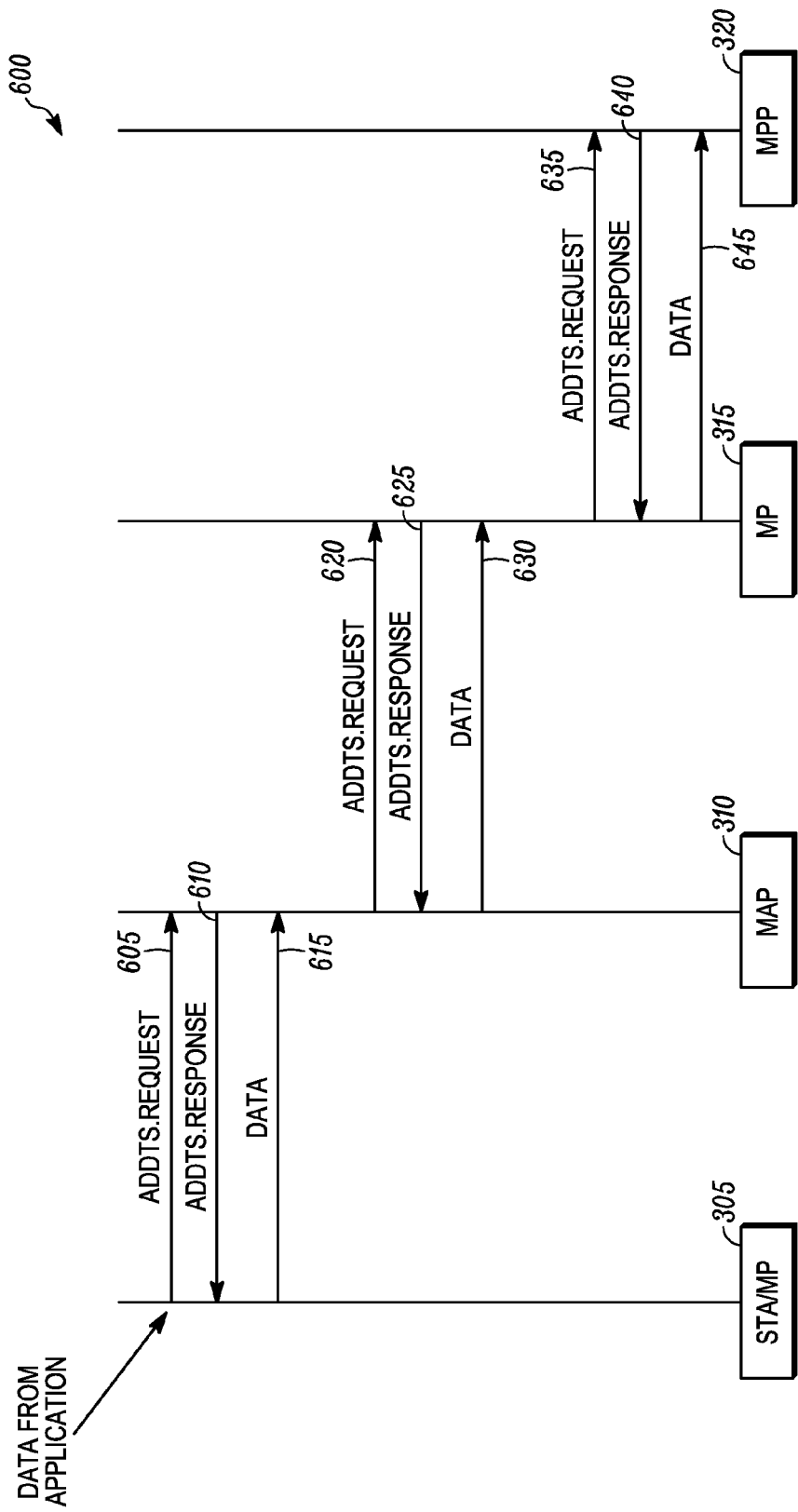
FIG. 6 is a data flow diagram illustrating a message flow for a multihop traffic stream reservation without the utilization of a Mesh Traffic Stream Information Element.

FIG. 6 is a data flow diagram illustrating a messaging flow 600 for a multihop traffic stream reservation without the utilization of the Mesh Traffic Stream Information Element 500. As illustrated in FIG. 6, data from an application is transmitted by a station or Mesh Point 305. The data flow begins with the station or Mesh Point (STA/MP) 305 sending an ADDTS.Request message 605 to its associated Mesh Access Point (MAP) 310. The MAP 310 responds with an ADDTS.Response message 610 to the STA/MP 305. The STA/MP 305 then sends the data 615 to the MAP 310. Upon receiving the data 615, the MAP 310 sends an ADDTS.Request message 620 to its next hop Mesh Point (MP) 315. The Mesh Point (MP) 315 responds with an ADDTS.Response message 625 to the MAP 310. The MAP 310 then sends the data 630 to the Mesh Point (MP) 315. Upon receiving the data 630, the Mesh Point (MP) 315 sends an ADDTS.Request message 635 to the Mesh Point Portal (MPP) 320. The Mesh Point Portal (MPP) 320 responds with an ADDTS.Response message 640 to the Mesh Point (MP) 315. The Mesh Point (MP) 315 then sends the data 645 to the Mesh Point Portal (MPP) 320. It will be appreciated by those of ordinary skill in the art that alternatively multiple mesh points can be implemented with multiple hops between the MAP 310 and the MPP 320, although only one was illustrated herein for exemplary purposes only. It will further be appreciated that the message flow described for FIG. 6 is time consuming and channel bandwidth consuming as each pair of devices must request/respond and send the data individually.

Figure 7:
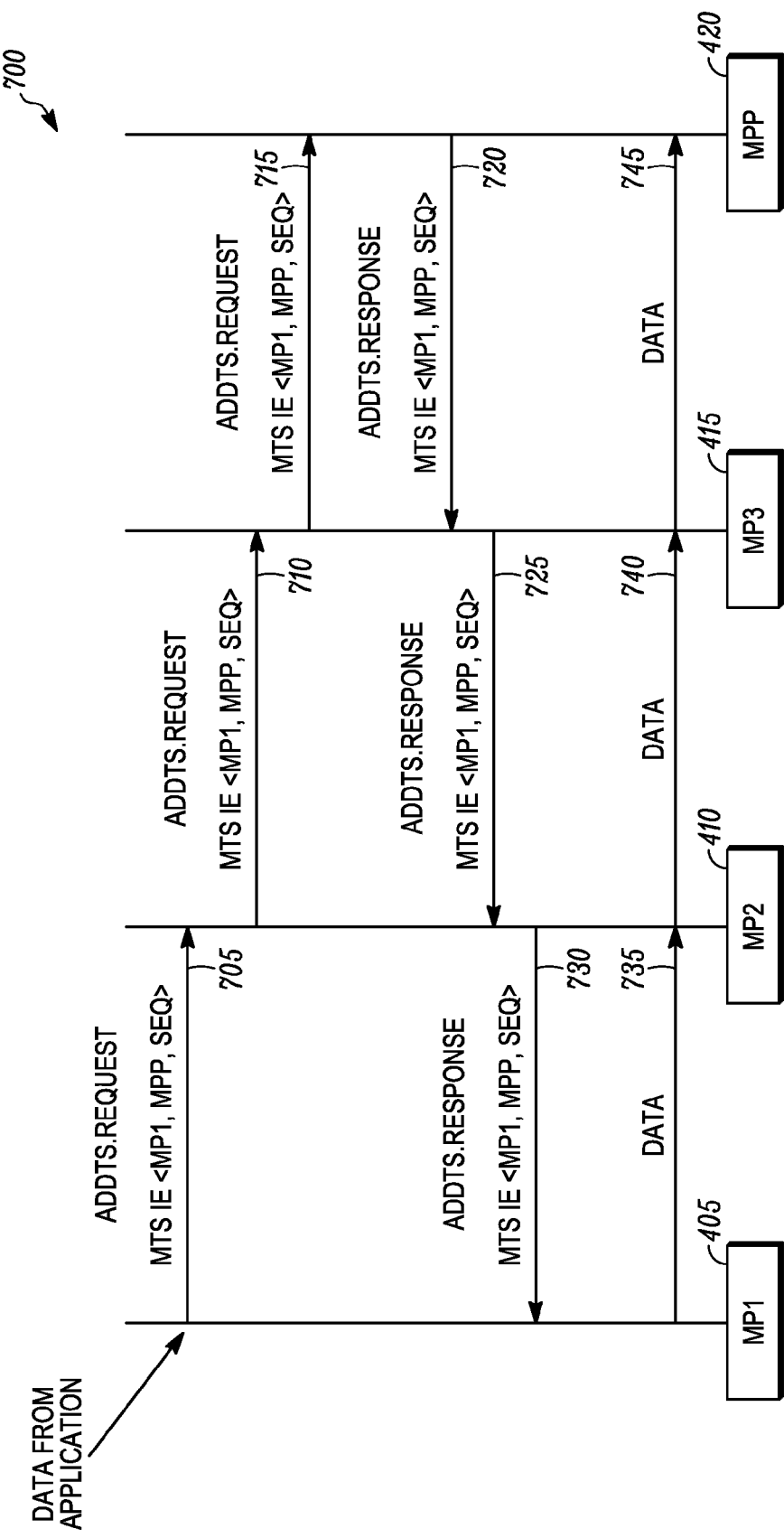
FIGS. 7, 8, and 9 illustrate exemplary message flow diagrams of distributed multihop traffic stream reservations using an end to end traffic stream setup including the utilization of the Information Element of FIG. 5 in accordance with some embodiments of the present invention.

FIG. 7 illustrates a message flow diagram 700 for a distributed multihop traffic stream reservation using an end to end traffic stream setup including the utilization of the Mesh Traffic Stream Information Element 500 in accordance with some embodiments of the present invention. Specifically, FIG. 7 illustrates a Mesh Point initiated reservation request using the Mesh Traffic Stream Information Element 500.

In accordance with the present invention, a traffic stream setup is triggered by the SME at the initiator MP1 405. Based on the trigger, the SME at the initiator MP1 405 decides if the flow needs admission control. If so the initiator MP1 405 sends a ADDTS.Request 705 including MTS IE <MP1,MPP, SEQ> to its next hop (MP2 410). MP2 410 checks if the ADDTS.Request needs to be forwarded (by its routing module). If so it checks if <MP1, TSID> maps to a particular flow in its traffic stream table. If not, a new traffic stream setup between MP2 410 and the next hop is needed.

After receiving an ADDTS.Request frame 705 from MP1 405, MP2 410 checks the destination MAC address (i.e. MPP) in the MTS IE to check if it already has a route to the destination or the destination is within its Basic Service Set (BSS) or in other words it is a station or a Mesh Point currently associated with MP2 410. When a multihop reservation is needed (when the destination is a multihop away), the routable device may have to first find the route to the destination before forwarding the ADDTS.Request 705. Route discovery in this case may be done based on the resource requirements in the ADDTS (by including the MTS IE into a route request (RREQ) management frame). For the discussion of FIG. 7, we assume that MP2 410 has a route to the destination or has found the route to the destination before forwarding the ADDTS.Request.

MP2 410 uses the MTS IE in the ADDTS.Request message 705 and its routing table to decide the next hop to send the ADDTS.Request frame 705. In the illustrated scenario, MP2 410 finds the next hop to forward the frame is MP3 415. MP2 410 updates it traffic stream table and creates a new entry for the MTS IE if needed. (see, for example, Tables 1 and 2 herein below). The MP2 410 then sends a ADDTS.Request 710 including the MTS IE <MP1, MPP, SEQ> to its next hop MP3 415. It should be noted that in this method of admission control, we retain the original traffic stream identification TSID (i.e. sequence code SEQ) during the multihop ADDTS.Request. MP3 415, after reception of the ADDTS.Request frame 710, checks if it can support the request. If so, it updates its own traffic stream table as shown in Table 2 and creates its own ADDTS.Request 715 including the MTS IE <MP1, MPP, SEQ> towards the next hop which in this case is the portal MPP 420. Once the portal MPP 420 determines that it is final destination of the ADDTS.Request and it can support the flow, it replies with an ADDTS.Response message 720 including the MTS IE <MP1, MPP, SEQ> which it sends to the MP3 415. This ADDTS.Response 720 is forwarded towards the initiator by MP3 415 sending an ADDTS.Response message 725 including the MTS IE <MP1, MPP, SEQ> to MP2 410, and then MP2 410 sending an ADDTS.Response message 730 including the MTS IE <MP1, MPP, SEQ> to the initiator MP1 405. The distributed traffic stream reservation is thus completed.

Next, MP1 405 can send the DATA frames 735 to MP2 410 which forwards the DATA frames 740 to MP3 415, which forwards the DATA frames 745 to MPP 420. The intermediate forwarding devices maintain the traffic stream forwarding tables to uniquely identify a flow with the <Reservation Originator Address, traffic stream identification/access category (TSID/AC)> tuple.

Table 1 and Table 2 herein below illustrate the storage of such traffic stream mappings at MP2 410 and MP3 415 respectively. Each forwarding device runs an independent timer for <Reservation Originator Address, traffic stream identification/access category (TSID/AC)> to monitor the activity of each stream. Entries in the traffic stream table maintained at each device are soft-state. Once a flow has been admitted to the system, the device runs an inactivity timer to check if the flow is still active. The value of inactivity should be such that it can allow the device to completely decipher if a call has been terminated. In addition, if a device's attempt of traffic stream reservation to another device fails or if a route to next hop is broken, it can proactively send a DELTS message to a previous hop to clear the traffic reservation. It should be noted that typically a base DELTS message does not include any MTS info. Hence sending a DELTS message as defined in 802.11e without any MTS information will delete all the flows which are using the given TSID/AC in the DELTS. Alternatively, to prevent this from happening and to selectively delete a flow, DELTS can be sent with a MTS information element indicating the reservation originator address, reservation terminator address and TSID/AC. This uniquely identifies a flow to delete.

TABLE 1

TS Table and Mapping at MP2 410

| Reservation Originator Address | Reservation Terminator Address | TSID or Access Category (AC) | SEQ | TSPEC Parameters | Resource Consumed in Current Averaging Period |
|---|---|---|---|---|---|
| MP1 405 | MPP 420 | A | 1 | . . . | |

TABLE 2

TS Table and Mapping at MP3 415

| Reservation Originator Address | Reservation Terminator Address | TSID or Access Category (AC) | SEQ | TSPEC Parameters | Resource Consumed in Current Averaging Period |
|---|---|---|---|---|---|
| MP1 405 | MPP 420 | A | 1 | . . . | |

It is worthwhile to note that an 802.11e implementation at MP1 405 might not have a MTS feature or a reservation might be initiated from a legacy STA which neither supports an 802.11e nor an MTS information element. In such situations, the multihop TS reservation works similar to FIG. 7, however end to end reservation is initiated after the reception of a DATA frame at MP2 410. This is needed to know the final destination of the frame. Hence in the later case there would be two independent phases of TS reservation, within a BSS and then in a WDS.

Figure 8:
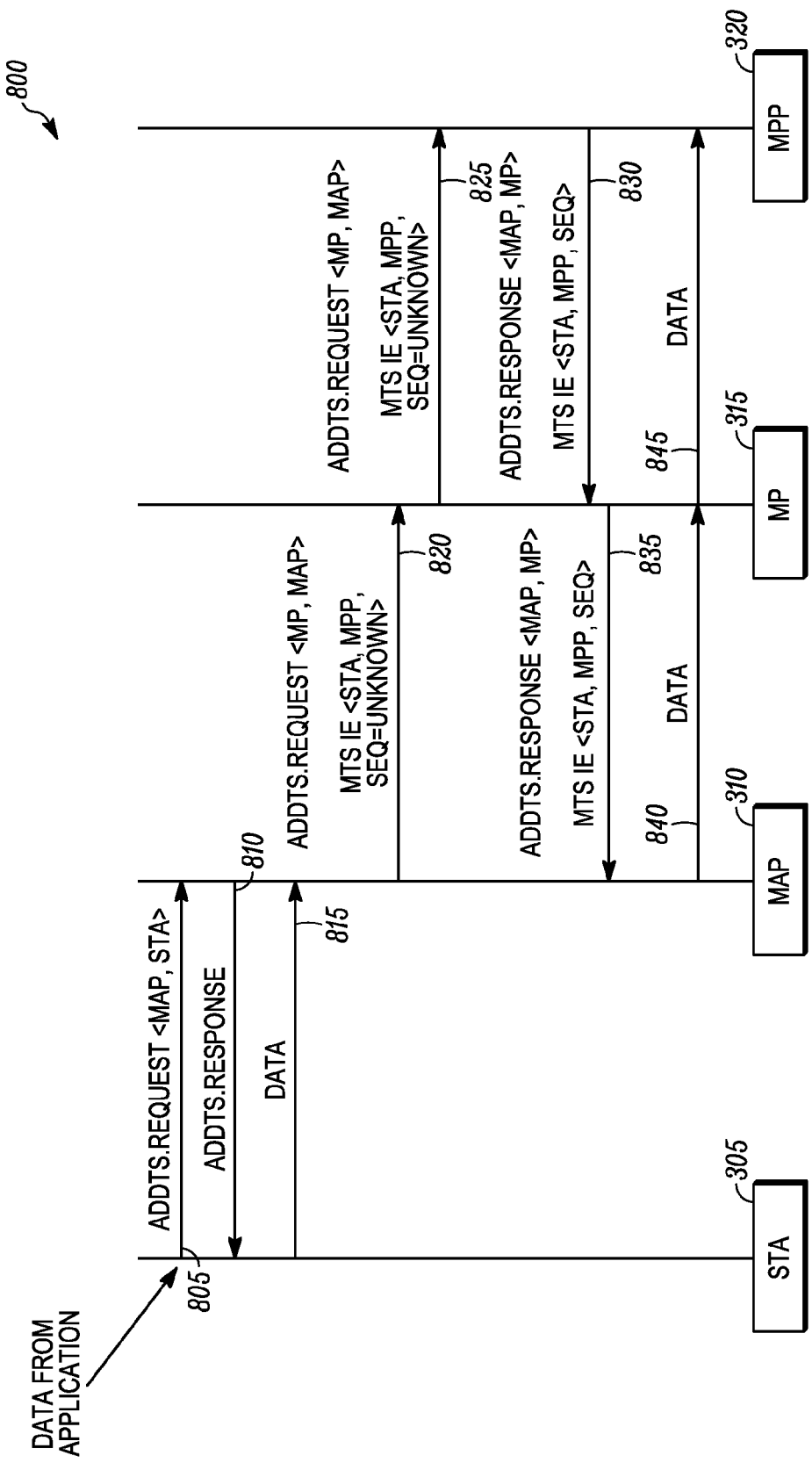

FIG. 8 illustrates a message flow diagram 800 for a distributed multihop traffic stream reservation using an end to end traffic stream setup including the utilization of the Mesh Traffic Stream Information Element 500 in accordance with some embodiments of the present invention. Specifically, FIG. 8 illustrates a station initiated reservation request using the Mesh Traffic Stream Information Element 500.

As illustrated in FIG. 8, data from an application is transmitted by an 802.11e enabled station 305. The data flow begins with the station 305 sending an ADDTS.Request message 805 including an ID for the MAP 310 and an ID for the station 305 <MAP, STA> to its associated Mesh Access Point (MAP) 310. The MAP 310 responds with an ADDTS.Response message 810 to the station 305. The station 305 then sends the data 815 to the MAP 310.

In response to receiving the data 815, the MAP 310 sends an ADDTS.Request message 820 including an ID for the next hop mesh point MP 315 and an ID for the MAP 310 <MP, MAP> to the MP 315. The ADDTS.Request message 820 also includes an MTS IE including a station ID, a portal ID, and a sequence code <STA, MPP, SEQ>. The sequence code in this case is handled by the MAP 310 on behalf of the STA 305. Since the MAP 310 is not aware of the sequence control of the flow initially, it sets the sequence code value to "Unknown" (−1) thereby informing the reservation terminating device (i.e. the MPP 320) to set the sequence code. The MP 315 then transmits an ADDTS.Request message 825 including an ID for the portal MPP 320 and an ID for the MP 315 <MPP, MP> to the MPP 320. The ADDTS.Request message 825 also includes an MTS IE including a station ID, a portal ID, and a sequence code <STA, MPP, SEQ>. It will be appreciated that although only one intermediary Mesh Point is illustrated in FIG. 8 between the MAP 310 and the portal MPP 320, any number of intermediary Mesh Points can be implemented along the traffic stream in accordance with the present invention.

Once the portal MPP 320 determines that it is the final destination of the ADDTS.Request and it can support the flow, it replies with an ADDTS.Response message 830 including an ID for the MPP 320 and an ID for the previous hop MP 315 and further including the MTS IE <STA, MPP, SEQ> which it sends to the MP 315. In the situation, as illustrated in FIG. 8, that the MPP 320 determines that the traffic stream reservation is a new reservation, and the MPP 320 therefore has no entry for the flow, and the sequence control value in the request is set to Unknown, the MPP 320 (which is the reservation terminating device in this example) will initialize the sequence control for this flow and include it in the MTS IE. When flow entry already exits and an ADDTS.Request is received with the sequence control set to unknown (e.g. during handoff), MPP 320 increments the sequence control value by one in its TS table and includes this updated value in its MTS IE. An ADDTS.Response 830 including the MTS IE is forwarded towards the MAP 310 by the MP 315 sending an ADDTS.Response message 835 including an ID for the MAP 310 and an ID for the MP 315 and further including the MTS IE <STA, MPP, SEQ> to MAP 310. Intermediate nodes, after receiving the ADDTS.Response, update their individual TS table with the new value of the sequence control. The distributed traffic stream reservation is thus completed.

Next, the MAP 310 sends the data 840 to the MP 315 which sends the data 845 onwards to the MPP 320 to complete the data transmission.

Figure 9:
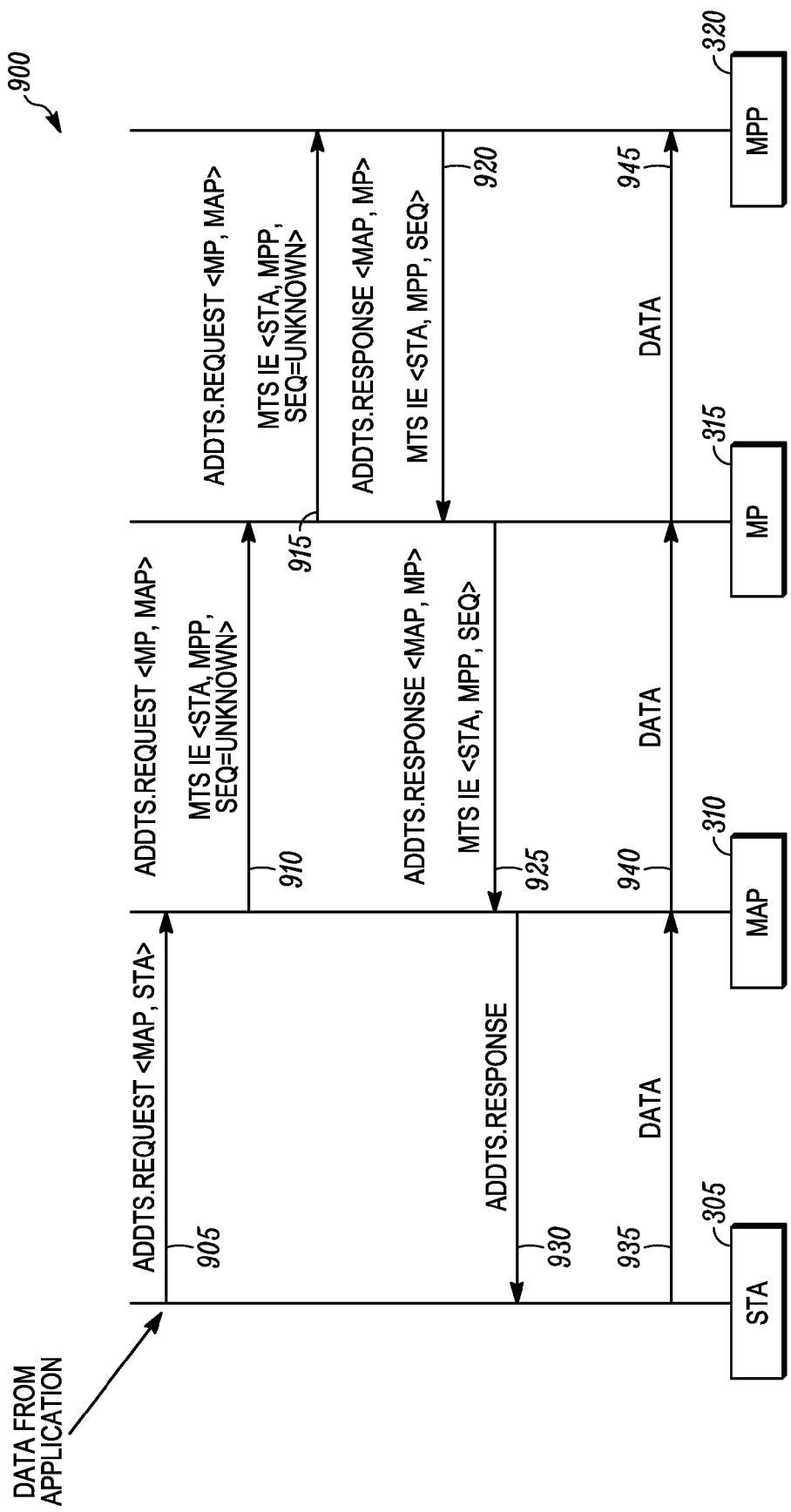

FIG. 9 illustrates a message flow diagram 900 for a distributed multihop traffic stream reservation using an end to end traffic stream setup including the utilization of the Mesh Traffic Stream Information Element 500 in accordance with some embodiments of the present invention. Specifically, FIG. 9 illustrates a 802.11e station initiated reservation request using the Mesh Traffic Stream Information Element 500 where it is assumed that traffic is always destined to a portal/gateway.

As illustrated in FIG. 9, the station 305 initiates a message flow by sending an ADDTS.Request message 905 including an ID for the MAP 310 and an ID for the station 305 <MAP, STA> to the MAP 310. After receiving the ADDTS.Request message 905, MAP 310 forwards an ADDTS.Request message 910 including an ID for the MAP 310 and an ID for the next hop Mesh Point MP 315 and further including the MTS IE <STA, MPP, SEQ=unknown>. Sequence control in this case is handled by the MAP 310 on behalf of the STA 305. Since the MAP 310 is not aware of the sequence number of the flow initially, it sets the sequence control value to "Unknown" (−1) and thus gives the reservation terminating device (MPP 320 in FIG. 9) responsibility for the sequence control. In this example, it is assumed that all flows are destined to the portal. MP 315 uses the MTS IE in the ADDTS.Request message 910 and its routing table to decide the next hop to send the ADDTS.Request message 910. In this case, MP 315 finds the next hop to forward the frame is the portal MPP 320. MP 315 sends a ADDTS.Request message 915 including an ID for the MPP 320 and an ID for the MP 315 and further including the MTS IE <STA, MPP, SEQ> to the portal MPP 320. It will be appreciated that although only one intermediary Mesh Point is illustrated in FIG. 9 between the MAP 310 and the portal MPP 320, any number of intermediary Mesh Points can be implemented along the traffic stream in accordance with the present invention.

Once the portal MPP 320 determines that it is final destination of the ADDTS.Request message 915 and it can support the flow, it replies with an ADDTS.Response message 920 including an ID for the MAP 310 and an ID for the MP 315 and further including the MTS IE <STA, MPP, SEQ> which it sends to the MP 315. When the traffic stream reservation is a new reservation, the MPP 320 has no entry for the flow, and the sequence control value is set to Unknown in the request message, the MPP 320 (which is the reservation terminating device in this scenario) will initialize the sequence control for this flow and include it in the MTS IE. When a flow entry already exits and an ADDTS.Request is received with the sequence control set to unknown (e.g. during handoff), MPP 320 increments the sequence control value by one in its TS table and includes this updated value in the MTS IE. This ADDTS.Response message 920 is forwarded towards the initiator by MP 315 sending an ADDTS.Response message 925 including an ID for the MAP 310 and an ID for the MP 315 and further including the MTS IE <STA, MPP, SEQ> to MP2 410, and then MAP 310 sending an ADDTS.Response message 930 to the initiator station 305. Intermediate nodes, after receiving the ADDTS.Response, update their TS table with the new value of the sequence control. The distributed traffic stream reservation is thus completed.

Next, station 305 can send the DATA frames 935 to MAP 310 which forwards the DATA frames 940 to MP 315, which forwards the DATA frames 945 to MPP 320 to complete the data transmission.

Mesh Traffic Stream Information Element with Flow Originator Identification

In an alternate embodiment of the present invention, the mesh traffic stream information element includes a flow originator address. It will be appreciated by those of ordinary skill in the art that this message format is useful for legacy station support.

Figure 10:
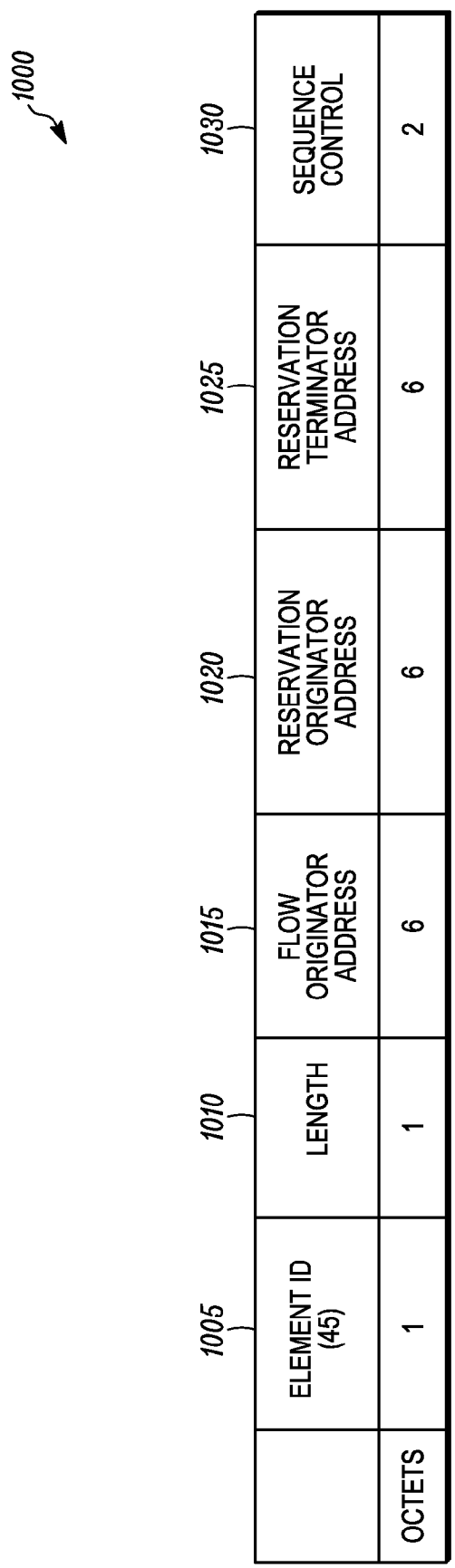
FIG. 10 illustrates an exemplary Information Element format in accordance with some embodiments of the present invention.

FIG. 10 illustrates an exemplary 802.11 Information Element in accordance with some embodiments of the present invention. Specifically, the Information Element Frame Format of FIG. 10 illustrates an exemplary Mesh Traffic Stream Information Element 1000 in accordance with some embodiments of the present invention. The Mesh Traffic Stream Information Element 1000 can, for example, be included with a Traffic Stream (TS) reservation management frame to do a multihop flow reservation. For example: Add Traffic Stream Request messages (ADDTS.Request), Add Traffic Stream response messages (ADDTS.Response), and Delete Traffic Stream messages (DELTS) can include the Mesh Traffic Stream Information Element Frame Format 1000 to forward a flow reservation request.

As illustrated in FIG. 10, the information element frame format 1000 includes an element identification (ID) 1005, a length 1010, a flow originator address 1015, a reservation originator address 1020, a reservation terminator address 1025, and a sequence control 1030. The flow originator address 1015 identifies the source of the traffic stream flow request. The reservation originator address 1020 identifies the source of the traffic stream message. The reservation terminator address 1025 identifies the destination of the traffic stream message. When the destination is outside the mesh, the reservation terminator address 1025 can be set to either the address of the portal or the destination address itself. The length field 1010 is an unsigned binary, which value defines the length in octets of the remaining message. The sequence control 1030 is incremented each time a re-negotiation of the same flow is done or during handoff when a reservation request for an existing flow is sent to a new QAP. The sequence control field 1030 helps in eliminating the chances of clearing a valid reservation due to a delayed TS delete request (e.g. DELTS) frame.

Figure 11:
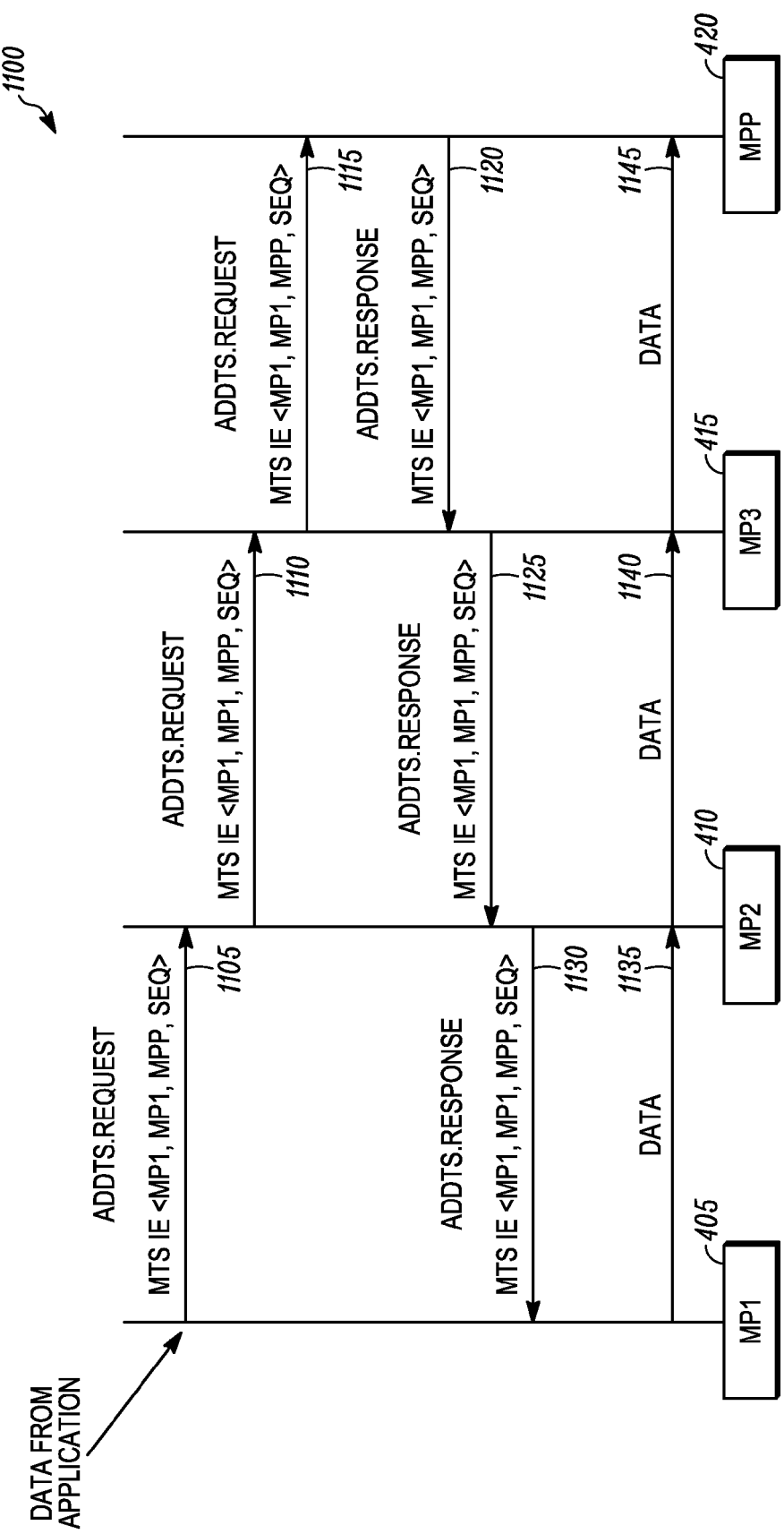
FIGS. 11, 12, and 13 illustrate exemplary message flow diagrams of distributed multihop traffic stream reservations using an end to end traffic stream setup including the utilization of the Information Element of FIG. 10 in accordance with some embodiments of the present invention.

FIG. 11 illustrates a message flow diagram 110 for a distributed multihop traffic stream reservation using an end to end traffic stream set up including the utilization of the Mesh Traffic Stream Information Element 1000 in accordance with some embodiments of the present invention. Specifically, FIG. 11 illustrates a Mesh Point initiated reservation request using the Mesh Traffic Stream Information Element 1000.

It should be noted that in the exemplary scenario of FIG. 11, the MTS information element is used to identify reservation end points for describing the CAC mechanism. Alternatively, in implementation, the TCLAS information element of 802.11e can be used to identify the reservation end points. However, an alternate definition of the TCLAS field (for example, MAC destination of TCLAS may correspond to the destination in the backbone rather than mesh destination) may create confusion in this alternative scenario.

In accordance with the present invention, a traffic stream setup is triggered by the SME at the initiator MP1 405. Based on the trigger, the SME at the initiator MP1 405 decides if the flow needs admission control. In the exemplary scenario of FIG. 11, the initiator of the call can support the utilization of a MTS information element as herein described. In the exemplary scenario of FIG. 11, the flow originator address and the reservation originator correspond to the same MAC address.

As illustrated in FIG. 11, when the initiator MP1 405 determines that it needs to perform resource reservation before sending any traffic for the corresponding AC, it sends a ADDTS.Request 1105 to its next hop MP2 410 with a MTS IE <MP1,MP1,MPP,SEQ>. In this case, both the flow originator address and the reservation originator address are set to the address of MP1 405.

After receiving the ADDTS.Request frame 1105 from MP1 405, MP2 410 checks the reservation terminator MAC address (MPP 420 in this example) in the MTS IE to determine if it already has a route to the terminator MPP 420, the terminator MPP 420 is within its BSS, or the terminator MPP 420 is outside the mesh. When the terminator MPP 420 is outside the mesh, CAC provisioning would be done to the portal. MP2 410 can set the reservation terminator in the received MTS IE to either a destination address or a portal address. In case a multihop reservation is needed (when the terminator is multihop away), a routable device may have to first find the route to the terminator before forwarding the ADDTS.Request. Route discovery in this case may be done based on the resource requirements in ADDTS (by including the MTS IE into RREQ management frame). For the example of FIG. 11, we assume that MP2 410 has a route to the terminator MPP 420 or has found the route to the destination before forwarding the TSPEC.

MP2 410 uses the MTS IE <MP1, MP1, MPP, SEQ> in the ADDTS Request 1105 and its routing table to decide the next hop to send the ADDTS.Request frame. In the example of FIG. 11, MP2 410 finds the next hop to forward the frame is MP3 415. MP2 410 updates it TS table with corresponding the TSID (which in this case is A, the same as the originating TSID at the originating station) and sends a ADDTS.Request message 1110 including the MTS IE <MP1, MP1, MPP, SEQ> to its next hop MP3 415. It should be noted that in this method of admission control, the original TSID is retained (in this case A at MP1 405) during the multihop ADDTS.Request. MP3 415, after reception of the ADDTS.Request frame 1110, checks if it can support the request. If it can support the request, it updates its own TS table as shown in Table 4 and creates its own ADDTS.Request 1115 towards the next hop, which in this example is the portal MPP 420. It will be appreciated that although only two intermediary Mesh Points are illustrated in FIG. 11 between the initiator MP1 405 and the portal MPP 420, any number of intermediary Mesh Points can be implemented along the traffic stream in accordance with the present invention.

The Portal MPP 430 thereafter checks that it is the terminator of the ADDTS.Request 1115 and determines whether or not it can support the flow. It then replies with a ADDTS.Response message 1120 including the MTS IE <MP1, MP1, MPP,SEQ>. This ADDTS.Response is forwarded towards the initiator including forwarding a ADDTS.Response message 1125 including the MTS IE <MP1, MP1, MPP,SEQ> from MP3 415 to MP2 410 and forwarding a ADDTS.Response message 1130 including the MTS IE <MP1, MP1, MPP, SEQ> from MP2 410 to MP1 405. The distributed TS reservation is then completed.

MP1 405 can thereafter send the DATA frames 1135 for the corresponding flow. The DATA 1140 is then forwarded from MP2 410 to MP3 415 and the DATA 1145 is forwarded from MP3 415 to MP 420 to complete the data transmission from initiator to destination.

Intermediate forwarding devices maintain the TS forwarding tables to uniquely identify a flow by <flow originator, reservation originator, TSID/AC>. Table 3 and Table 4 herein below outline such TS mappings at MP2 410 and MP3 415 respectively.

Each forwarding device runs an independent timer for <Flow originator, reservation originator, TSID/AC> to monitor the activity of each stream. Entries in the TS table maintained at each MP are soft-state. Once a flow has been admitted to the system, the MP runs an inactivity timer to check if the flow is still active. The value of inactivity should be such that it can allow the MP to completely decipher if a call has been terminated. In addition, if a MP attempt of TS reservation to another MP fails or if route to next hop is broken, it can proactively send a DELTS message to previous hop to clear the traffic reservation. In this case, DELTS should be sent with a MTS information element. This uniquely identifies a flow to delete.

Figure 12:
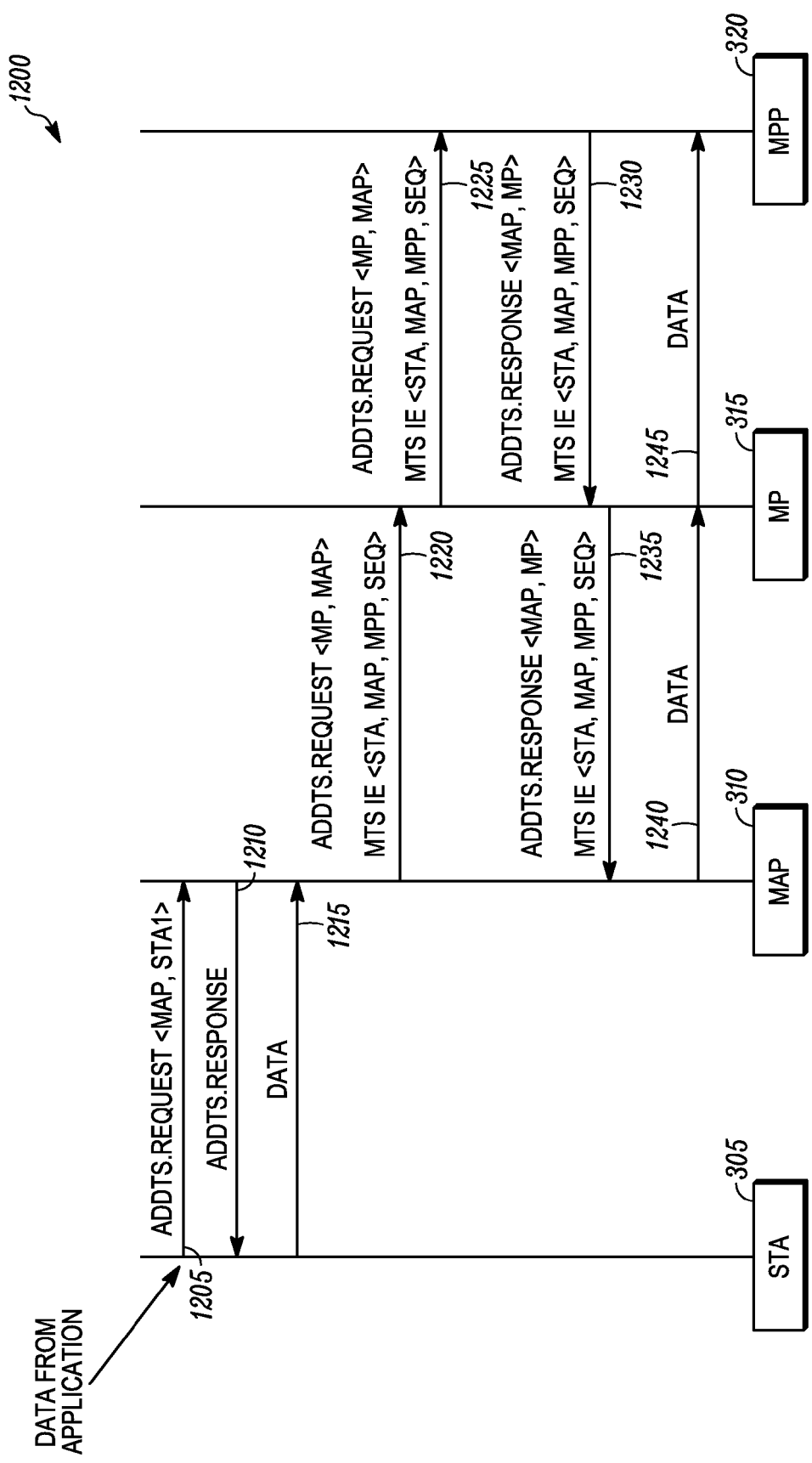

FIG. 12 illustrates a message flow diagram 1200 for a distributed multihop traffic stream reservation using an end to end traffic stream setup including the utilization of the Mesh Traffic Stream Information Element 1000 in accordance with some embodiments of the present invention. Specifically, FIG. 12 illustrates a station initiated reservation request using the Mesh Traffic Stream Information Element 1100 in the situation where the flow originating device is a legacy STA and hence it is not aware of the MTS IE. The operation of FIG. 12 as described herein addresses the requirement of providing a CAC for legacy stations even if the station does not support 802.11e TSPEC or the MTS IE.

The first step in providing CAC to legacy stations is to identify if the frames received from the STA needs a CAC. Reservation in this case will become a two step process: first is reception of a frame for TID 6, second is the reservation from the QAP to the reservation terminating device based on the destination field of frame received which includes creating the TSPEC on behalf of the STA. FIG. 12 illustrates a mechanism of admission control signaling for legacy STAs.

An alternate implementation (not shown) may also use a higher layer signaling between the STA and QAP (at application layer), wherein the STA before starting the flow requests resource reservation from the QAP.

As illustrated in FIG. 12, data from an application is transmitted by a legacy station 305. The data flow begins with the station 305 sending an ADDTS.Request message 1205 including an ID for the MAP 310 and an ID for the station 305 <MAP, STA> to its associated Mesh Access Point (MAP) 310. The MAP 310 responds with an ADDTS.Response message 1210 to the station 305. The station 305 then sends the data 1215 to the MAP 310.

Before sending the ADDTS.Request 1220 to the next hop MP 315, MAP 310 determines which sequence number to use. MAP 310 in this case maintains an independent counter for each legacy STA 305 per AC which needs CAC. Intermediate nodes, after receiving a ADDTS.Request with a Reservation Initiator address different than the Originator address in the MTS knows that the reservation is initiated by a proxy

TABLE 3

TS Table and Mapping at MP1

| Flow Originator | Reservation Originator | Reservation Terminator | TSID | Sequence Number | TSPEC Parameters | Resource Consumed in current Averaging Period |
|---|---|---|---|---|---|---|
| MP1 | MP1 | Portal | A | 0 | . . . | |

TABLE 4

TS Table and Mapping at MP2

| Flow Originator | Reservation Originator | Reservation Terminator | TSID | Sequence Number | TSPEC Parameters | Resource consumed in current Averaging Period |
|---|---|---|---|---|---|---|
| MP1 | MP1 | Portal | A | 0 | . . . | | device (i.e. the MAP 310 in this example). The TS maintenance follows the same mechanism as outlined previously herein for FIG. 11.

Thereafter, the MAP 310 sends an ADDTS.Request message 1220 including an ID for the next hop mesh point MP 315 and an ID for the MAP 310 <MP, MAP> to the MP 315. The ADDTS.Request message 820 also includes an MTS IE including a station ID, a MAP ID, a portal ID, and a sequence code <STA, MAP, MPP, SEQ>.

The MP 315 then transmits an ADDTS.Request message 1225 including an ID for the portal MPP 320 and an ID for the MP 315 <MPP, MP> to the MPP 320. The ADDTS.Request message 1225 also includes an MTS IE including a station ID, a MAP ID, a portal ID, and a sequence code <STA, MAP, MPP, SEQ>. It will be appreciated that although only one intermediary Mesh Point is illustrated in FIG. 12 between the MAP 310 and the portal MPP 320, any number of intermediary Mesh Points can be implemented along the traffic stream in accordance with the present invention.

It will be appreciated by those of ordinary skill in the art that it can be detrimental to copy the legacy STA MAC sequence number in the Flow Identifier IE generated at the MP 315. For example, if a STA handoffs to a new MP, it most probably will reset its sequence number which may create a problem for the existing flows which may see a decrease in Flow Identifier sequence number.

Once the portal MPP 320 determines that it is the final destination of the ADDTS.Request and it can support the flow, it replies with an ADDTS.Response message 1230 including an ID for the MAP 310 and an ID for the previous hop MP 315 and further including the MTS IE <STA, MAP, MPP, SEQ> which it sends to the MP 315. An ADDTS.Response 1230 including the MTS IE is forwarded towards the MAP 310 by the MP 315 sending an ADDTS.Response message 1235 including an ID for the MAP 310 and an ID for the MP 315 and further including the MTS IE <STA, MAP, MPP, SEQ> to MAP 310. Intermediate nodes, after receiving the ADDTS.Response, update the TS table with the new value of the sequence control. The distributed traffic stream reservation is thus completed.

Next, the MAP 310 sends the data 1240 to the MP 315 which sends the data 1245 onwards to the MPP 320 to complete the data transmission.

Figure 13:
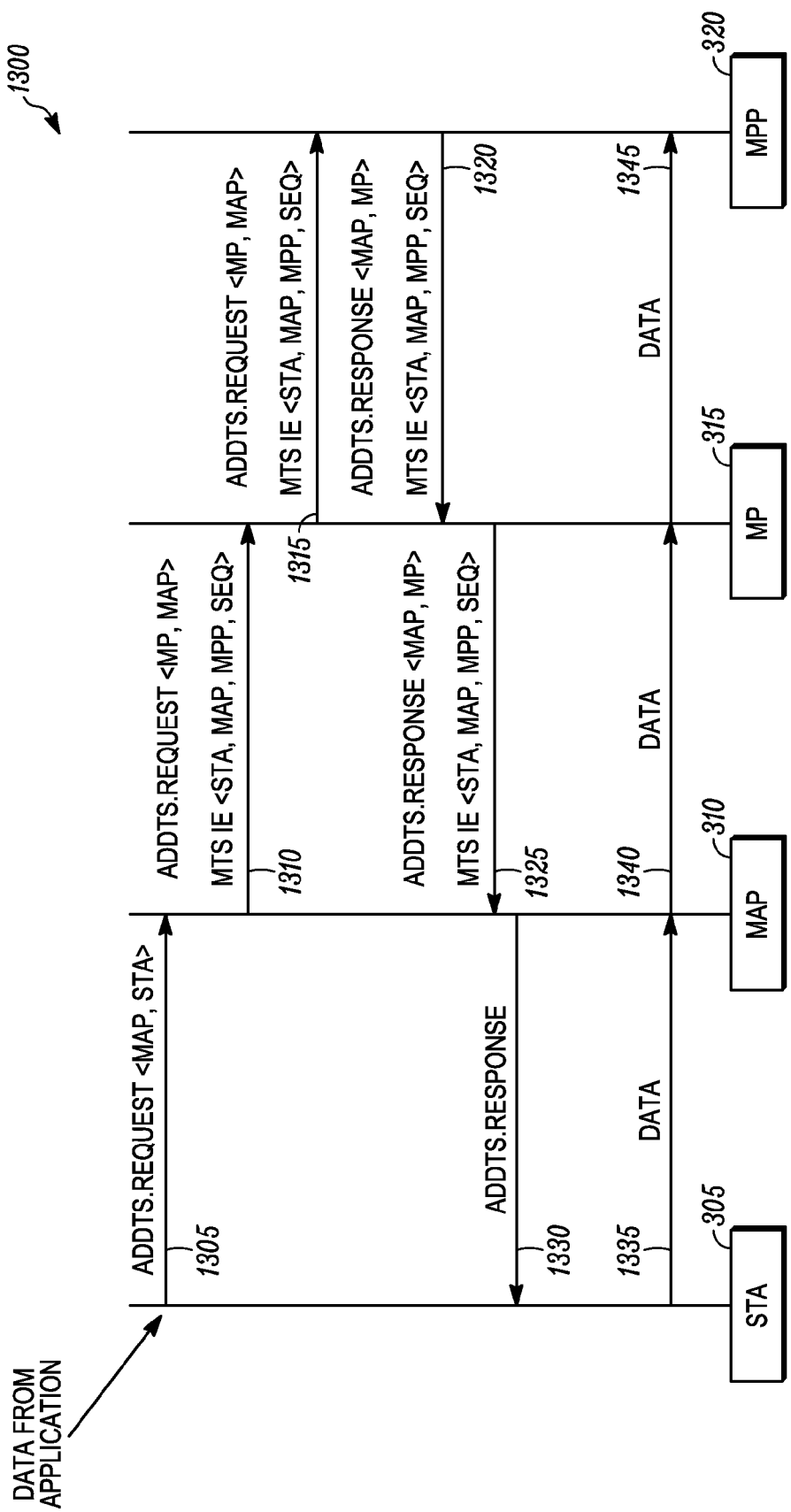

FIG. 13 illustrates a message flow diagram 1300 for a distributed multihop traffic stream reservation using an end to end traffic stream setup including the utilization of the Mesh Traffic Stream Information Element 1000 in accordance with some embodiments of the present invention. Specifically, FIG. 13 illustrates a legacy station initiated reservation request using the Mesh Traffic Stream Information Element 1000 where it is assumed that traffic is always destined to a portal/gateway.

As illustrated in FIG. 13, the station 305 initiates a message flow by sending an ADDTS.Request message 1305 including an ID for the MAP 310 and an ID for the station 305 <MAP, STA> to the MAP 310. After receiving the ADDTS.Request message 1305, MAP 310 forwards an ADDTS.Request message 1310 including an ID for the MAP 310 and an ID for the next hop Mesh Point MP 315 and further including the MTS IE <STA, MAP, MPP, SEQ>. Sequence control in this case is handled by the MAP 310 on behalf of the STA 305. In this case it is assumed that all flows are destined to the portal. MP 315 uses the MTS IE in the ADDTS.Request message 1310 and its routing table to decide the next hop to send the ADDTS.Request message 1310. In this case, MP 315 finds the next hop to forward the frame is the portal MPP 320. MP 315 sends a ADDTS.Request message 1315 including an ID for the MPP 320 and an ID for the MP 315 and further including the MTS IE <STA, MAP, MPP, SEQ> to the portal MPP 320. It will be appreciated that although only one intermediary Mesh Point is illustrated in FIG. 13 between the MAP 310 and the portal MPP 320, any number of intermediary Mesh Points can be implemented along the traffic stream in accordance with the present invention.

Once the portal MPP 320 determines that it is final destination of the ADDTS.Request message 1315 and it can support the flow, it replies with an ADDTS.Response message 1320 including an ID for the MAP 310 and an ID for the MP 315 and further including the MTS IE <STA, MAP, MPP, SEQ> which it sends to the MP 315. This ADDTS.Response message 1320 is forwarded towards the initiator by MP 315 sending an ADDTS.Response message 1325 including an ID for the MAP 310 and an ID for the MP 315 and further including the MTS IE <STA, MAP, MPP, SEQ> to MP2 410, and then MAP 310 sending an ADDTS.Response message 1330 to the initiator station 305. Intermediate nodes, after receiving the ADDTS.Response, update their TS table with the new value of the sequence control. The distributed traffic stream reservation is thus completed.

Next, station 305 can send the DATA frames 1335 to MAP 310 which forwards the DATA frames 1340 to MP 315, which forwards the DATA frames 1345 to MPP 320 to complete the data transmission.

The present invention as described herein provides a novel signaling method for transporting admissions control request and response information between a source and a destination mesh point. This method enables forwarding nodes along the path between a source and destination mesh point to make hop by hop admissions control decisions about the admissibility of individual traffic streams in cases where a path to the destination is known. When either the final destination or a path to the final destination is unknown, this invention provides a method of breaking the admissions control signaling into two phases for legacy devices, wherein the first phase reserves resources between the source and the its MAP and the second phase reserves resources between the MAP and the final destination. Moreover, the signaling method defines a sequence number to be included in the admissions control request to permit intermediate nodes along a path to distinguish between requests to update the end to end resource reservation, possibly due to the source moving and establishing a link with a new forwarding node, and requests issued to tear down a previous reservation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for communicating a multihop flow reservation between a reservation originator and a reservation terminator along a path comprising a plurality of nodes in a multihop wireless network, the method comprising:

communicating one or more reservation messages between each of the plurality of nodes and an associated next hop node, wherein each of the communicated reservation messages includes an information element comprising:
an identification of the reservation originator of the multihop flow reservation,
an identification of the reservation terminator of the multihop flow reservation, and
a sequence control, wherein the sequence control identifies a current state of progress of the multihop flow reservation within the multihop wireless network and wherein the sequence control is incremented to indicate an operation on the multihop flow reservation;
receiving one or more reservation messages at the associated next hop node;
determining, by the associated next hop node, if the identification of the reservation originator combined with a traffic stream identification/access category maps to a particular flow in a traffic stream table of the associated next hop node; and
creating a new entry in a traffic stream table for the identification of the reservation originator and the traffic stream identification/access category when the identification of the reservation originator combined with the traffic stream identification/access category does not map to a particular flow in the traffic stream table.

2. A method for communicating a multihop flow reservation as claimed in claim 1, wherein the multihop wireless network comprises an 802.11e network, and further wherein the one or more reservation messages are selected from a group of messages comprising an Add Traffic Stream Request message (ADDTS.Request), an Add Traffic Stream response message (ADDTS.Response), and a Delete Traffic Stream message (DELTS).

3. A method for communicating a multihop flow reservation as claimed in claim 1, wherein the identification of the reservation originator identifies a source of the multihop flow reservation, and wherein the identification of the reservation terminator identifies a destination of the multihop flow reservation.

4. A method for communicating a multihop flow reservation as claimed in claim 1, wherein each of the communicated reservation messages further comprises:
an identification of a flow originator.

5. A method for communicating a multihop flow reservation as claimed in claim 1, further comprising:
determining a further next hop node using the identification of the reservation terminator in the information element and a routing table in the next hop node; and
sending the one or more reservation messages including the information element to the further next hop node.

6. A method for communicating a multihop flow reservation as claimed in claim 5, further comprising:
determining if the further next hop node is the terminator node; and
repeating the receiving, determining, creating, determining and sending steps at the further next hop node when the further next hop node is not the terminator node.

7. A method for communicating a multihop flow reservation as claimed in claim 1, further comprising:
updating, by the associated next hop node, a flow entry associated with a particular flow in the traffic stream table when the identification of the reservation originator combined with the traffic stream identification/access category maps to the particular flow in the traffic stream table of the next hop node and the sequence control in the received information element is more than a current sequence control in the flow entry.

8. A method for communicating a multihop flow reservation as claimed in claim 6, further comprising:
replying with an add data traffic stream response message including the information element when the further next hop node is the terminator node and the received reservation message is for a new flow.

9. A method for communicating a multihop flow reservation as claimed in claim 8, further comprising:
forwarding the add data traffic stream response message including the information element towards the initiator.

10. A method for communicating a multihop flow reservation as claimed in claim 9, further comprising:
forwarding one or more data frames from the initiator through the next hop node and the further next hop node to the terminator node.

11. A method for communicating a multihop flow reservation as claimed in claim 8, further comprising:
communicating a delete transmission stream message including the information element; and
deleting an entry in each of the traffic stream tables when the sequence number in the information element is greater than or equal to the sequence number of the flow maintained at the traffic stream table.

12. A method for communicating a multihop flow reservation as claimed in claim 6, further comprising:
replying with an add data traffic stream response message including the information element when the further next hop node is the terminator node and the received reservation message is for an existing flow when the sequence control in the received information element is more than a current sequence control entry for the flow in the traffic stream table.

13. A method for communicating a multihop flow reservation as claimed in claim 1, wherein the initiator comprises a device which can not support the traffic stream information element.

14. A method for communicating a multihop flow reservation as claimed in claim 13, wherein the associated next hop node comprises an access point, the method further comprising:
maintaining the sequence number on behalf of the device which can not support the traffic stream information element at the access point.

15. A method for communicating a multihop flow reservation as claimed in claim 14, further comprising:
receiving a data frame at the access point;
determining if the data originator identification combined with the traffic stream identification/access category maps to a particular flow in a traffic stream table of the access point; and
creating a new entry in the traffic stream table for the data originator as the reservation originator and the traffic stream identification/access category when the data originator identification combined with the traffic stream identification/access category does not map to a particular flow in the traffic stream table.

16. A method for communicating a multihop flow reservation as claimed in claim 15, further comprising:
creating a new traffic stream information element at the access point on behalf of the device which can not support the traffic information element;
setting the sequence control value to unknown by the access point on behalf of the device which can not support the traffic information element;

setting the reservation originator as the identification data frame originator; and setting the reservation terminator as the identification of the destination of the data frame.

17. A method for communicating a multihop flow reservation as claimed in claim 16, further comprising when the next hop node is the terminator node:

setting the sequence code value by the terminator node when the sequence control in the received frame was set to unknown.

18. A method for communicating a multihop flow reservation as claimed in claim 1, wherein the information element further comprises an identification of a flow originator, the method further comprising:

creating a new entry in the traffic stream table for the identification of the flow originator, the identification of the reservation originator, and the traffic stream identification/access category when the identification of the flow originator and the identification of the reservation originator combined with the traffic stream identification/access category does not map to a particular flow in the traffic stream table.

19. A method for communicating a multihop flow reservation as claimed in claim 18, further comprising:

updating the flow entry in the traffic stream table when the identification of the flow originator and the identification of the reservation originator combined with the traffic stream identification/access category maps to a particular flow in the traffic stream table of the next hop node and the sequence control in the received information element is more than a current flow entry in the traffic stream table.

* * * * *

UNITED STATES PATENT AND TRADEMARK OFFICE
CERTIFICATE OF CORRECTION

PATENT NO. : 8,248,999 B2
APPLICATION NO. : 11/559239
DATED : August 21, 2012
INVENTOR(S) : Gossain et al.

It is certified that error appears in the above-identified patent and that said Letters Patent is hereby corrected as shown below:

In Column 3, Line 35, after "Distribution", insert -- System --.

In Column 8, Line 12, delete "needed." and insert -- needed --, therefor.

Signed and Sealed this
Fifth Day of February, 2013

Teresa Stanek Rea
*Acting Director of the United States Patent and Trademark Office*